United States Patent [19]

Blessinger

[11] Patent Number: 4,775,900
[45] Date of Patent: Oct. 4, 1988

[54] APPARATUS FOR ENCODING AN NRZ DIGITAL SIGNAL AS A BRZ SYNCHRONOUS FM SIGNAL

[75] Inventor: Kurt V. Blessinger, Cardiff-by-the-Sea, Calif.

[73] Assignee: Eastman Kodak Company, Rochester, N.Y.

[21] Appl. No.: 875,822

[22] Filed: Jun. 18, 1986

[51] Int. Cl.⁴ .................. G11B 5/09; G11B 20/14; H03M 7/00
[52] U.S. Cl. ...................................... 360/40; 360/41; 341/69
[58] Field of Search ............. 360/40, 41, 43, 48, 360/10.1, 10.3; 375/17, 20, 48; 340/347 DD

[56] References Cited

U.S. PATENT DOCUMENTS

| | | | |
|---|---|---|---|
| 3,931,472 | 1/1976 | Gill et al. | 179/15 BA |
| 3,978,284 | 8/1976 | Yoshino et al. | 178/69.5 R |
| 4,063,197 | 12/1977 | Dreher | 375/48 |
| 4,096,520 | 6/1978 | Furuta | 375/48 |
| 4,201,942 | 5/1980 | Downer | 375/17 |
| 4,253,185 | 2/1981 | Danielsen | 375/20 |
| 4,280,221 | 6/1981 | Chun et al. | 375/17 |
| 4,298,959 | 11/1981 | Sundermeyer et al. | 364/900 |
| 4,307,417 | 12/1981 | Tokuyama | 360/10.1 |
| 4,352,095 | 9/1982 | Assard | 340/347 |
| 4,381,427 | 4/1983 | Cheal et al. | 179/2 DP |
| 4,383,279 | 5/1983 | Kenney, II | 360/10.1 |
| 4,416,007 | 11/1983 | Huizinga et al. | 370/62 |
| 4,425,666 | 1/1984 | Groth et al. | 375/48 |
| 4,528,676 | 7/1985 | Mein et al. | 375/14 |
| 4,618,941 | 10/1986 | Linder et al. | 360/41 |

Primary Examiner—Raymond F. Cardillo
Assistant Examiner—Surinder Sachar
Attorney, Agent, or Firm—William F. Noval

[57] ABSTRACT

In a multitrack motion analyzer in which video information representing a scene is recorded at a fast frame rate and played back at a slower frame rate, digital data timing and synchronization signals relating to each recorded frame is simultaneously recorded on a separate track as bipolar return to zero (BRZ) FM signals. A Non Return to Zero (NRZ) bit serial digital data signal and synchronous data clock signal are encoded as BRZ digital data signals and then frequency modulated so that the "1" bit, the "0" bit, and the "return to zero" signal levels of the BRZ data signal are converted to three frequencies. The three frequencies are integral multiples and synchronous to the data rate of the NRZ digital data signal so as to eliminate uncertainty between bit boundaries and allow packing more bits per unit time for a given carrier bandwidth. Additionally, accurate synchronization information is recorded and recovered by inserting a missing clock in the BRZ data stream. In a preferred embodiment in which the motion analyzer is operable at different frame rates, the FM frequencies representing the BRZ data signal are chosen to be a function of the ratio between the record frame rate and the playback frame rate which results in constant playback frequencies regardless of record rate.

8 Claims, 9 Drawing Sheets

| COL. 1 | COL. 2 | COL. 3 | COL. 4 | COL. 5 | COL. 6 | COL. 7 | COL. 8 |
|---|---|---|---|---|---|---|---|
| CAMERA AND RECORD FRAME RATE (FPS) | RECORD TAPE SPEED (IPS) | PLAYBACK FRAME RATE (FPS) | PLAYBACK TAPE SPEED (IPS) | N | SPEED REDUCTION R | RECORD FREQUENCY (MHZ) BL-WH. | PLAYBACK FREQUENCY (MHZ) BL-WH. |
| 30 | 7½ | 30 | 7½ | 33⅓ | 1 | .125-.210 | .125-.210 |
| 60 | 15 | 30 | 7½ | 16⅔ | 2 | .250-.420 | .125-.210 |
| 125 | 31¼ | 30 | 7½ | 8 | 4 | .521-.833 | .125-.210 |
| 250 | 62½ | 30 | 7½ | 4 | 8 | 1.042-1.666 | .125-.210 |
| 500 | 125 | 30 | 7½ | 2 | 16⅔ | 2.083-3.333 | .125-.210 |
| 1000 | 250 | 30 | 7½ | 1 | 33⅓ | 4.166-6.666 | .125-.210 |

ASYNCHRONOUS

SYNCHRONOUS

| FRAME RATE | BRZ | BRZ FM MHz | DIVISOR M |
|---|---|---|---|
| 30 | +1 | .092 | 200 |
|  | RTZ | .184 | 100 |
|  | -1 | .277 | 67 |
| 60 | +1 | .184 | 100 |
|  | RTZ | .369 | 50 |
|  | -1 | .553 | 33 |
| 125 | +1 | .384 | 48 |
|  | RTZ | .768 | 24 |
|  | -1 | 1.152 | 16 |
| 250 | +1 | .768 | 24 |
|  | RTZ | 1.536 | 12 |
|  | -1 | 2.304 | 8 |
| 500 | +1 | 1.536 | 12 |
|  | RTZ | 3.072 | 6 |
|  | -1 | 4.608 | 4 |
| 1000 | +1 | 3.072 | 6 |
|  | RTZ | 6.144 | 3 |
|  | -1 | 9.216 | 2 |

FIG. 10a

| $A_2$ | $A_3$ | $A_4$ | FRAME RATE |
|---|---|---|---|
| 1 | 0 | 1 | 30 |
| 1 | 0 | 0 | 60 |
| 0 | 1 | 1 | 125 |
| 0 | 1 | 0 | 250 |
| 0 | 0 | 1 | 500 |
| 0 | 0 | 0 | 1000 |

FIG. 10b

| $A_0$ | $A_1$ | BRZ |
|---|---|---|
| 0 | 0 | RTZ |
| 0 | 1 | RTZ |
| 1 | 0 | -1 |
| 1 | 1 | +1 |

FIG. 10c

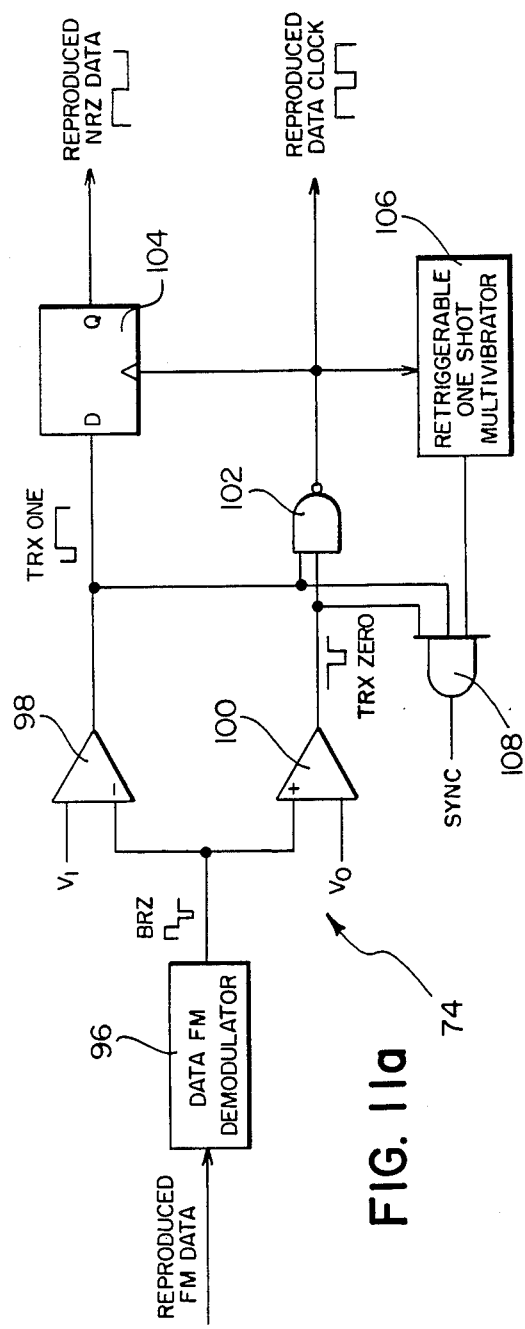
FIG. 11a
FIG. 11c
FIG. 11b

APPARATUS FOR ENCODING AN NRZ DIGITAL SIGNAL AS A BRZ SYNCHRONOUS FM SIGNAL

BACKGROUND OF THE INVENTION

In general, this invention relates to the processing of digital data and more particularly, this invention relates to the conversion of NRZ digital data into BRZ digital data which is frequency modulated in a synchronous manner, for recording on magnetic tape.

Motion analysis of fast moving phenomena in slow motion entails the recording of a great number of images during an event at high speed, and then playing the images back slowly to analyze the movement which has occurred in step-by-step progression. Applications for motion analysis include malfunctions in high speed machinery, movements of an athlete, failure of safety equipment, shattering of an object and physical reactions to a tire hitting a pothole at high speed. One type of motion analyzer includes a video camera, a variable speed magnetic tape processor and a cathode ray tube (CRT) display monitor. The camera is capable of producing signals corresponding to selected frame rates of from 60 to about 2000 frames per second. The magnetic tape processing system is capable of recording at one tape speed and appropriately slowing down the tape during playback to a certain predetermined speed to down convert the camera signals regardless of the camera frame rate, to a nominal frame rate of 30 or 60 frames per second. The CRT display monitor receives the second frame rate playback signal from the magnetic tape processing system and displays the scene in question at an appropriate slow motion, depending upon the selected camera frame rate.

The display monitor of such a motion analyzer may be provided with a data frame border which displays various items of information recorded on the tape with each frame image. Such items of information include the time of day and date on which the frame was recorded, the elapsed time since the beginning of the recording, a user entered identification number for each test, recording rate selected, a frame counter from beginning of recording, and other information relative to the scene being recorded. In such a magnetic tape processing system, the video information is recorded as FM signals on a plurality of parallel linear tracks on magnetic tape. A multigap record head and multigap reproduce head are utilized for recording and reproducing the video signals from the tape. In order to minimize the number of magnetic heads required to record and reproduce signals from the magnetic tape, it is desirable that the information relating to each frame be recorded in the minimum number of tracks on the magnetic tape. Since the data relating to information concerning a given frame is conventionally in the format of a non return to zero (NRZ) digital data signal, if the NRZ digital data signals were recorded directly on tape, a separate data rate timing signal would also have to be recorded on a separate track on the tape in order to accurately reproduce the recorded data. This necessitates the use of two tracks on the tape for the data, and thus increases the number of recording and reproducing heads and the width of tape required for recording the information data signal. It is thus desirable that digital data information be recorded on the magnetic tape in a single track in order to reduce recording space on the tape, and the number of recording and reproducing magnetic heads needed in the magnetic tape processor.

Similarly, it is also desirable that efficient data packing densities on the tape is effected and that accurate synchronization information be recorded on the data track so that the data may be recovered in synchronism with the related video information.

Since the speed at which the video data is recorded on tape is variable in relation to the frame rate of recording, but the video information is played back at the same tape speed irrespective of the recording speed, it is also desirable that the data recording technique take into account the varying tape speeds at which the video information is recorded so that there will be constant data signal frequencies played back, thus simplifying the playback circuitry.

Thus it is desirable that, in recording and reproducing digital data, the reproduced digital data signal duplicate the original digital data signal so that accurate information relating to a frame is displayed on the monitor.

SUMMARY OF THE INVENTION

According to the present invention, there is provided a technique for processing digital data of an NRZ format so that the digital data may be recorded at varying tape speeds and played back at the same tape speed without loss of bit information and with the accurate recovery of the digital data clock. The digital signal processing system of the present invention also permits the recording of digital data in a single track on magnetic tape, thus simplifying signal processing circuitry, minimizing the number of record and reproduce magnetic heads needed and the amount of magnetic tape space required for digital data recording.

According to an aspect of the invention, a bit serial digital data signal having an NRZ format and a data rate of $f_D$ is encoded as a bipolar return to zero (BRZ) digital data signal in which a "1" bit is represented by a first signal level, a "0" bit is represented by a second signal level, and "return to zero" is represented by a third signal level. This format effectively encodes both the bit pattern and data clock in a single encoded signal. The BRZ digital data signal is converted into an FM signal in a synchronous manner for recording in a single track on magnetic tape. The first BRZ signal value representing a "1" bit is converted to an FM signal $S_1$ having a frequency $n_1 f_D$; the second BRZ signal value representing a "0" bit is converted to an FM signal $S_2$ having a frequency $n_2 f_D$, and the third "BRZ" signal value representing "return to zero" is converted to an FM signal $S_3$ having a frequency $n_3 f_D$ where $n_1$, $n_2$ and $n_3$ are different integers of one or greater. Thus, the BRZ FM signal representing a "1" bit has the form $S_1 S_3$ and the BRZ FM signal representing a "0" bit has the form $S_2 S_3$. Because the FM signals $S_1$, $S_2$, and $S_3$ have frequencies which are integral multiples of the NRZ digital data rate, the BRZ FM data signal is recorded synchronously on magnetic tape. Upon playback, the transition between one FM signal to another FM signal is at the zero crossing so that ambiguities in the reproduced signal are minimized, accurate timing information and digital data recovery are effected and more packing of bits per unit time for a given carrier bandwidth is allowed.

According to another aspect of the invention, the frequencies at which the BRZ FM data signal are recorded on magnetic tape are varied as a function of the frame rate and tape speed during recording. All reproduced FM data signals have the same frequencies thus greatly simplifying the reproduction processing circuit design. Thus, separate processing circuits need not be provided for processing reproduced signals recorded at different tape speeds.

According to another aspect of the invention, accurate synchronization information is recorded and recovered by inserting a missing data clock in the BRZ data stream.

DESCRIPTION OF THE DRAWINGS

In a detailed description of the preferred embodiments of the invention presented below, reference is made to the accompanying drawings in which like numerals refer to like elements.

FIGS. 10a-10c show the relationship between various operational parameters of the embodiment shown in FIG. 9;

FIG. 11a is a schematic diagram of a data playback processing circuit according to the present invention; and FIGS. 11b and 11c are a truth table and a signal diagram, respectively, which illustrate the operation of the circuit of FIG. 11a.

DESCRIPTION OF THE PREFERRED EMBODIMENTS

In the following description of the preferred embodiments of the digital data signal processing technique of the present invention, the present invention will be described as included in a motion analyzer. It will be understood, however, that the digital data signal processing technique of the present invention may be used in applications other than data recording on magnetic tape. For example, the technique may be used in recording on optical media, such as optical discs, recording on other magnetic media, such as magnetic discs, and transmission of digital data over a communications channel such as cable, satellite, direct broadcast, or the public telephone system.

The application in which the embodiments of the present invention will be described relates to a motion analyzer which records scene information at a high frame rate and plays back such information at a slower frame rate, thereby allowing slow motion analysis of a moving object. The imager frame rate used for recording is variable between 30 and 1,000 frames per second, depending upon the desired speed reduction while the display frame rate is constant at 30 frames per second. Accordingly, the apparent speed at which an object moves when viewed upon playback will be reduced by a factor equal to the ratio of the recording frame rate to the playback frame rate. The maximum speed reduction is therefore about 33 (i.e. 1,000 divided by 30). At this speed reduction, the exposure time for each frame is 1/1000 of a second which is short enough to provide high resolution images, with very little image smear of rapidly moving objects.

To accomplish such frame rate conversion, the variable speed magnetic tape processor records and reproduces an imager signal with a recording tape speed to reproduction tape speed ratio that equals the ratio of the imager frame rate to the display frame rate. The magnetic tape processor operates in cooperation with a divide-by-N circuit that selectively alters the frequency content of the video signal to be recorded, and in a manner to be described in detail below, both the value of (N) and the ratio of the recording to playback tape speed are controlled by the selected speed reduction.

Figure 1:
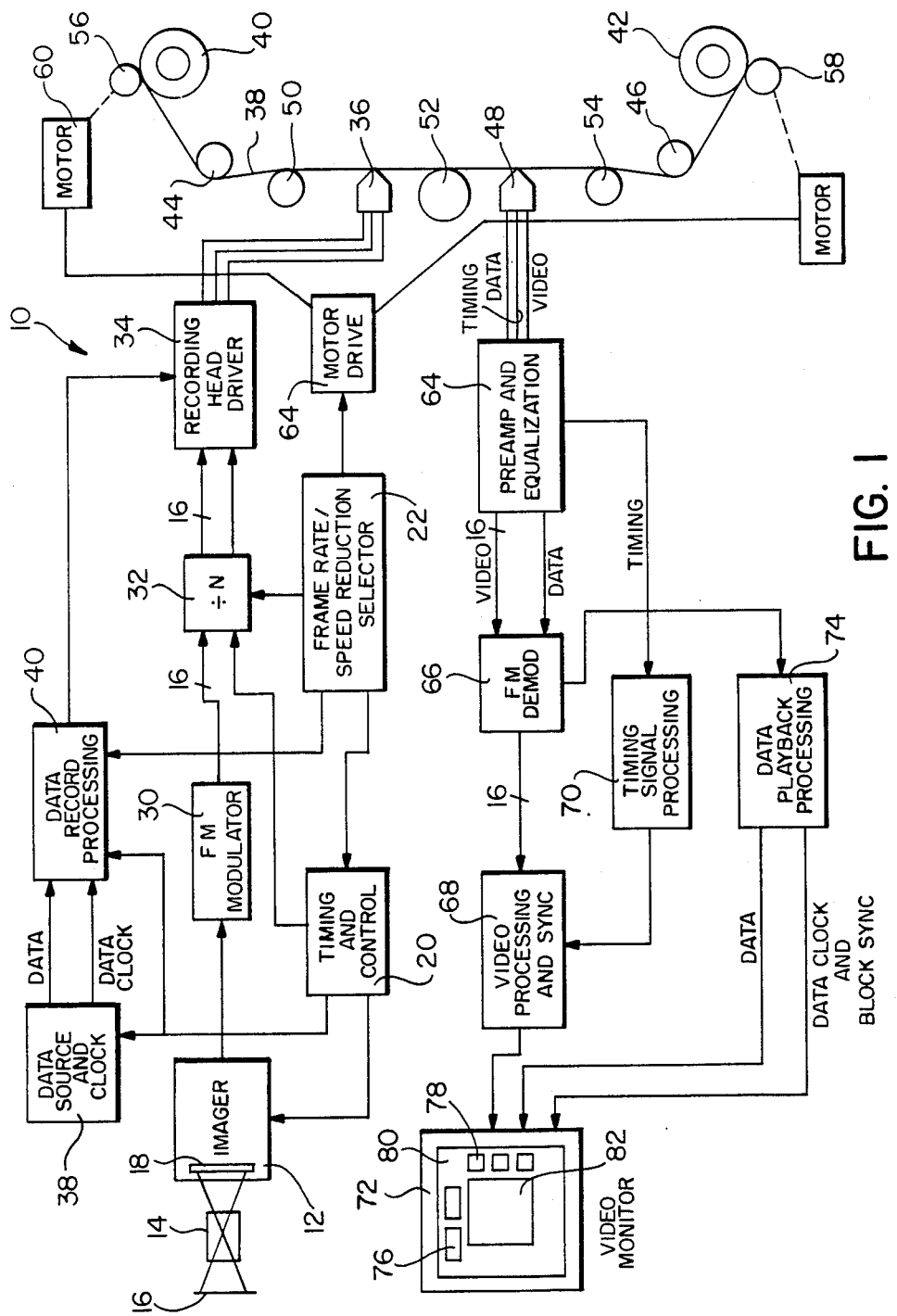
FIG. 1 is functional block diagram of a motion analyzer in which the digital data signal processing system according to the present invention is used.

Referring to FIG. 1, there is shown a functional block, schematic diagram showing a motion analyzer including an embodiment of the present invention. The motion analyzer 10 includes an imager 12 having a lens 14 which images a scene 16 onto a sensor 18. Imager 12 is controlled by timing and control circuit 20 which supplies suitable timing signals to imager 12 as a function of the operator selectable frame rate and speed reduction entered into by selector 22. The timing signals produced by circuit 20 are in accordance with the parameters tabulated in Columns 1 and 5 of FIG. 5. Thus, if a speed reduction of 8 (Col. 5) is selected, the imager will image scene 16 at a frame rate of 250 frames per second (Col. 1).

Sensor 18 is a "block" readable area image sensor. The basic concept of a block readout of a solid state area image sensor is disclosed in U.S. Pat. No. 4,322,752 in the name of James A. Bixby which is incorporated herein by reference. Specific types of block readable sensors are disclosed in U.S. Pat. No. 4,322,638, issued Mar. 30, 1982 in the names of T. H. Lee and R. P. Khosla; and U.S. Pat. No. 4,330,796 in the name of C. N. Anagnostopoulos et al, both of which are herein incorporated by reference.

Figure 2:
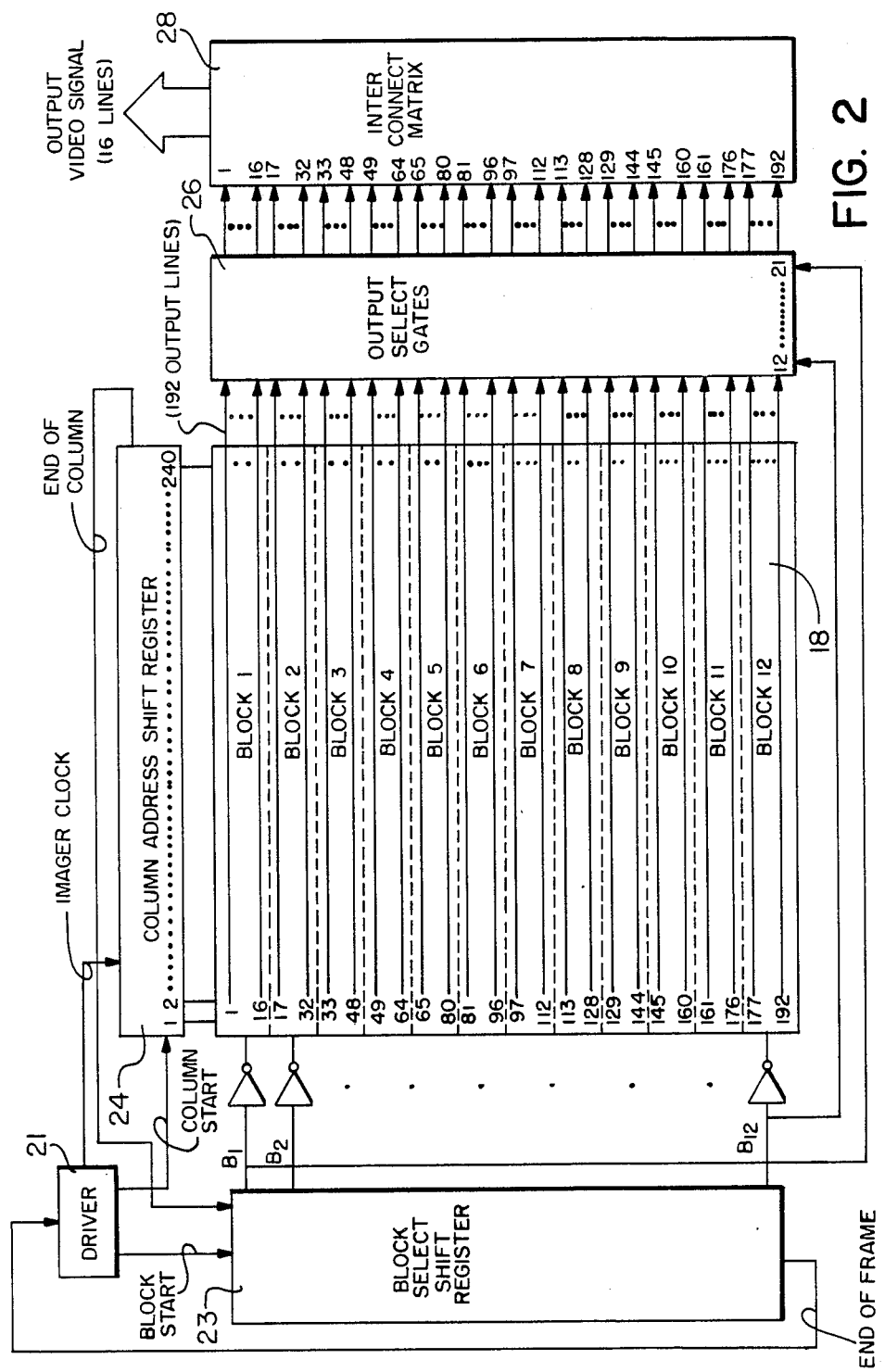
FIG. 2 is a functional block schematic diagram of a block readable area imager.

Although the referenced patents provide detailed information, the basic concept of block readout is illustrated in FIGS. 2 and 3. FIG. 2 shows a block readable sensor 18 that includes an array of photosites (not shown individually) arranged in 192 rows and 240 columns. For purposes of readout, sensor 18 is formatted into 12 blocks of 16 photosite rows each. Although demarcation between blocks is indicated by dashed lines, it will be understood that no physical demarcation on the sensor itself is necessary. Each photosite is readable upon the application thereto of an enablement signal and an address signal. To begin readout, a driver 21 produces a BLOCK START signal that causes a block select shift register 23 to produce an enablement signal that enables (via block enable line $B_1$) all photosite rows within block 1, i.e. rows 1-16. In response to a COLUMN START signal from the driver 21 column address electronics in the form of a shift register 24 sequentially addresses the 240 photosite columns of the entire area image sensor 18. Because the photosite rows within blocks 2-12 (rows 17-192) are not enabled, only photosite rows 1-16 (block 1) are read out at this time. The remaining photosites in the not-enabled blocks continue to integrate charge in response to incident radiation from scene 16. After all columns have been addressed an END OF COLUMN signal sequences the block select shift register 23 to enable via block enable line $B_2$, the block 2 photosite rows i.e. rows 17-32. Column-wise readout then proceeds as described above for the block 1 photosite rows. This process is repeated until all 12 blocks of photosite rows are read out at which time END OF FRAME signal from block select shift register 23 resets driver 21 for readout of the next frame.

Output select gates 26 and an interconnect matrix 28 of conductive bus lines perform the function of a block multiplexer that causes only signals from the 16 photosite rows within the block that is being read out to appear as an output signal. Reference is made to U.S. Pat. No. 4,322,752 referenced above for a more detailed discussion of the construction of output select gates 26 and matrix 28.

As a result of such read out, block information is produced in series and each block of information contains 16 row signals arranged in parallel. A result of such a readout technique is a reduction of the time required for sensor readout by a factor of 16 (i.e. the number of photosite rows in a block).

Figure 3A:
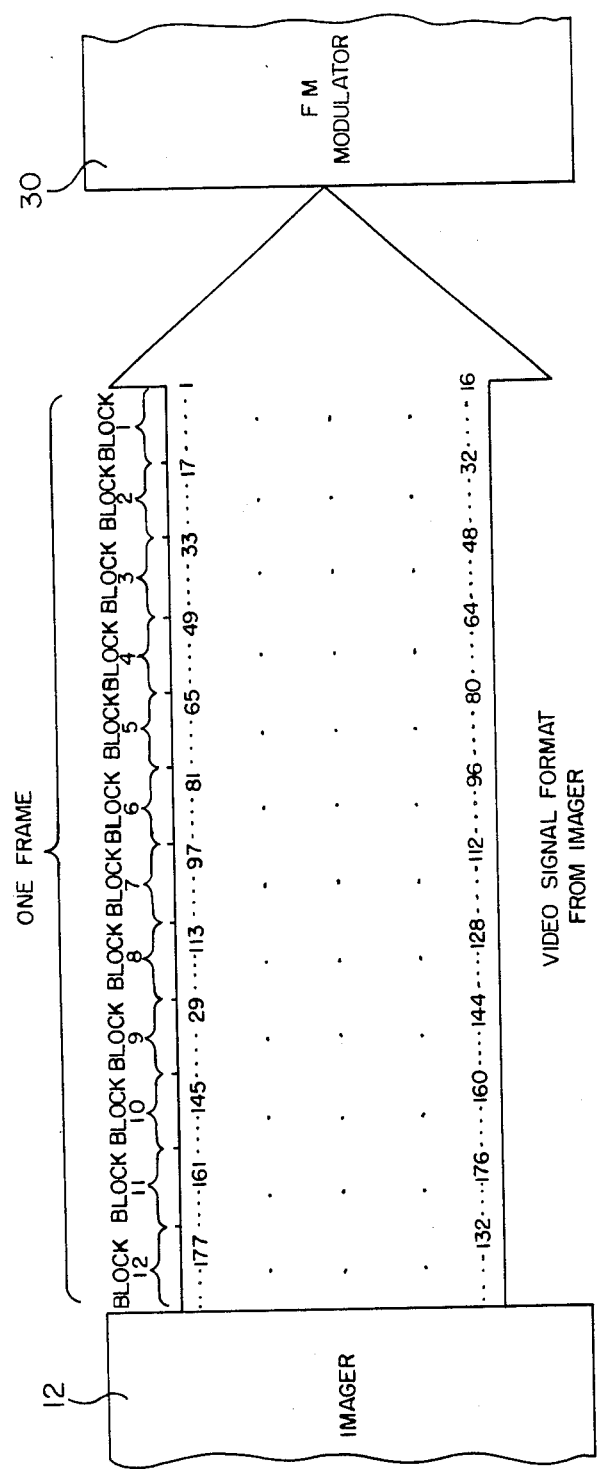
FIGS. 3a and 3b depict the format and content of a video signal produced by block readout of an area image sensor.
Figure 3B:
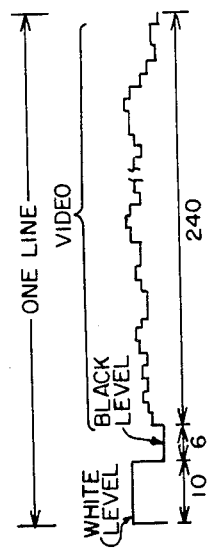

As shown in FIG. 3a, the video signal resulting from block readout of a single frame is comprised of serial train of block information wherein each block is comprised of 16 lines of video information that correspond to the 16 rows of photosites within each block. Each individual line of video information (see FIG. 3a) is an analog signal varying in level proportionate to the level of scene illuminance, and each line contains 240 picture elements (pixels) that correspond respectively to the 240 photosites in each row of photosites. Although, as shown in FIG. 3b, only 240 pixels represent the active video information of a line of video information, each line is in reality 256 pixel periods in length with 16 pixel periods representing a black level reference signal of six pixel periods and a white level reference signal of 10 pixel periods.

As shown in FIG. 3a, each channel of information includes the video information of every 16th line of image sensor 18. Thus, the first signal includes lines 1, 17, 33, 49, 65, 81, 97, 113, 129, 145, 161, and 177, and the last video information channel includes lines 16, 32, 48, 64, 80, 96, 112, 128, 144, 160, 176, and 192.

Referring again to FIG. 1, each of the 16 line signals that constitutes the analog video signal from imager 12 is frequency modulated in an FM modulator circuit 30 on a carrier having a black level frequency of 4.166 MHz and a white level frequency of 6.666 MHz.

The frequency modulated video signals undergo a divide-by-N process in a divide-by-N circuit 32. A suitable divide-by-N circuit which may be adapted to the apparatus shown in FIG. 1 is illustrated in FIG. 7 of commonly-assigned U.S. Pat. No. 4,496,995 issued Jan. 29, 1985, by J. H. Colles et al. The value of "N" is equal (to the nearest integer) to the maximum selectable speed reduction divided by the selected speed reduction. The relationship between "N" and various values of the speed reduction "R" is given in columns 5 and 6 of FIG. 5. It will be noted that the selected speed reduction has been used to determine both the frame rate at which sensor 18 is read out and the value of "N" in the divide-by-N circuit 32. While it may not be apparent how these two parameters (frame rate and "N") relate to slow motion replay, the discussion which follows will show that the selection of these two parameters as described above in conjunction with the proper selection of a third parameter (recording tape speed) will produce the desired speed reduction of scene information upon playback.

A timing signal from timing and control circuit 20 is also applied to circuit 32 to be divided by the same factor "N" as the FM video signals.

The output of the divide-by-N circuit 32 is comprised of seventeen frequency divided frequency modulated signals. These signals are applied to a recording head driver circuit 34 that drives an 18 channel magnetic recording head 36. Channel 18 of the recording head is used for recording digital data according to the present invention. The digital data is produced by a data source 38 which produces digital data signals in non return to zero (NRZ) digital format which is processed by data record processing circuit 40. Source 38 also provides data clock signals which are in synchronism with the digital data signals to data recording processing circuit 40. The processed data signal is supplied to recording head driver 34 and then to the magnetic recording head for track 18 in multihead 36.

The 18 signals are recorded along 18 separate channels or tracks on magnetic tape 38. (FIG. 4) Magnetic tape 38 is provided in a cassette having supply reel 40, takeup reel 42, and tape guides 44 and 46. When the cassette is inserted into apparatus 10, tape 38 is pressed against recording head 36 and reproducing head 48 as well as external guides 50, 52, and 54. Tape is advanced from reel 40 to reel 42 by means of capstans 56 and 58 respectively driven by capstan motors 60 and 62, controlled by motor drive 64.

The speed at which magnetic tape 38 is advanced during recording is selected to be proportional to the selected speed reduction and frame rate of recording. The relationship of the record frame rate, record tape speed and speed reduction is tabulated in columns 1, 2, and 6, respectively of FIG. 5. For example, if a record frame rate of 250 frames per second (Column 1) is chosen with a speed reduction R of 8 (column 6), then the magnetic tape 38 would be advanced at a speed of 62½ inches per second (Column 2).

Figures 4, 5:
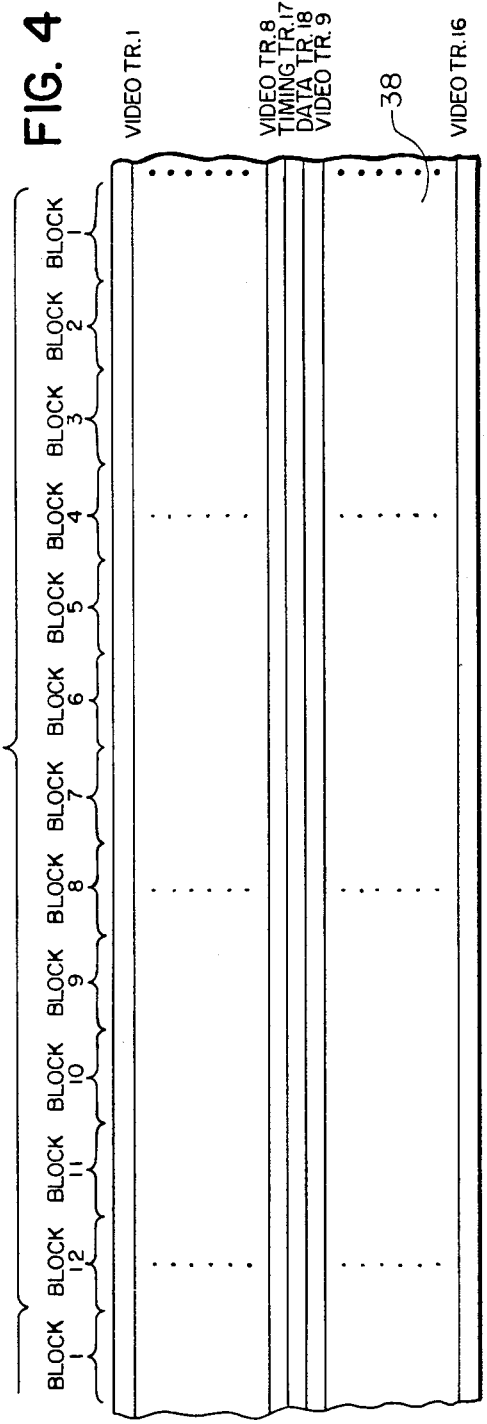
FIG. 4 shows the multitrack format of video information and digital data recorded longitudinally on magnetic tape.
FIG. 5 shows the relationship between various operational parameters of the motion analyzer shown in FIG. 1.

Upon recording, the signals retain the block format (as shown in FIG. 4) in which a timing track 17 and a data track 18 are located between video tracks 1-8 and video tracks 9-16.

Having recorded information on magnetic tape 38 that corresponds to a scene including an object under study, a slow motion video display of such object is produced by playing back the recorded information at a constant tape speed of say, 7½ inches per second irrespective of the originally selected recording tape speed. As a result, the ratio of the recording tape speed to the playback tape speed yields a tape speed reduction ratio that equals the selected speed reduction. Further, all reproduced signals have the same black to white level frequency spread, thereby enabling a fixed frequency demodulator to be used irrespective of the selected speed reduction. To understand why the above-described selection of recording frame rate, the factor "N", recording tape speed and playback tape speed results in the desired speed reduction and signal form upon playback, reference is made to FIG. 5. It is apparent from inspection of FIG. 5 that "N" is equal to the maximum selected camera (record) frame rate divided by the selected camera frame rate. The effect of the divide-by-N circuit 32 is to reduce the black level to white level frequency spread by a factor "N". But because the ratio of record tape speed to playback tape speed varies in inverse proportion to "N", all signals produced upon playback have the same black level to white level frequency spread. Further, because the playback tape speed is always 7½ inches per second, all video information is reproduced at a frame rate of 30 frames per second, thereby resulting in the desired speed reduction.

As a specific example, assume that a speed reduction of 8 is selected. Selecting a speed reduction of 8 will cause the imager sensor 18 to be read out a frame rate of 250 frames per second. The FM modulator 30 frequency modulates the video signal onto a 4.166 MHz carrier having a white level of 6.666 MHz. The divide-by-N circuit 32 with N=4 reduces the frequency of the video signal by a factor of 4, pk thereby resulting in a frequency modulated signal having a black level frequency equal to 1.042 MHz and a white level frequency of 1.666 MHz. This signal is recorded at a tape speed of 62.5 inches per second. Playing back this signal at a tape speed of 7½ inches per second results in a recovered signal that has a black level frequency of 0.125 MHz and a white level frequency of 0.210 MHz. The desired speed reduction of 8 (more precisely 8⅓) has thus been achieved.

Referring again to FIG. 1, the sixteen video signals produced by playback head 48 undergo signal processing in a preamplification and equalizatiaon circuit 64. The processed signals are then demodulated in an FM demodulator 66. After demodulation, the video signals (which are still in the block format shown in FIG. 3a) are converted to a line sequential video signal by a video processing and sync circuit 68.

A timing signal reproduced from timing track 17 is processed by circuit 64 and is applied to timing signal processing circuit 70 which extracts suitable timing and sync signals which are used in video processing and sync circuit 68 to produce a signal to be displayed on monitor 72. The displayed scene information consists of a slow motion replay of the originally recorded scene at the selected speed reduction.

Data from data track 18 is reproduced by reproducing head 48 and preamplified and equalized in circuit 64. The BRZ FM data signal is then processed by data playback processing circuit 74 to be shown in window areas such as 76, 78 in a data frame 80 surrounding the main image area 82 of monitor 72.

Figure 9:
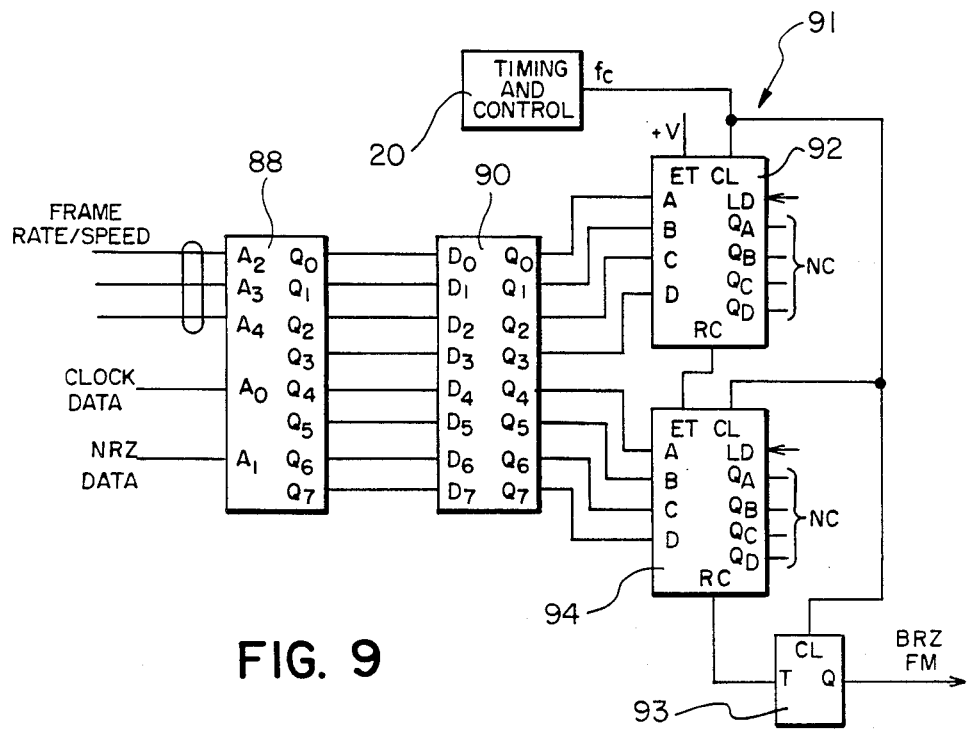
FIG. 9 is a block diagram of another embodiment of the present invention.

Video processing and sync circuit 68 may take the form of the format conversion circuit shown in FIG. 9 of the aforementioned commonly assigned U.S. Pat. No. 4,496,995.

According to the present invention, digital data relating to information pertinent to a frame of video being recorded is recorded on a data track at the same time as the video information. The data source 38 (FIG. 1) produces digital data in the non return to zero (NRZ) format at a bit frequency of $f_D$. The NRZ digital data signal and data clock signal are supplied to data record processing circuit 40.

Figure 7A:
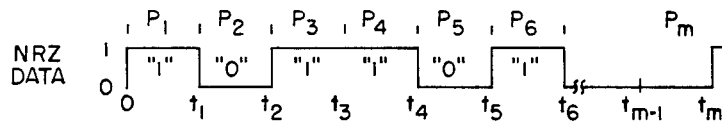
FIGS. 7a-7i are signal diagrams illustrating the operation of the present invention.
Figure 7B:

Samples of NRZ data signal and associated data clock signal are shown in FIGS. 7a and 7b. The signal waveform shown in FIG. 7a represents the digital number 101101 for the first six data periods P1–P6. In the NRZ format, the "0" bit is represented by a low signal value and the "1" bit is represented by a high signal value. If the NRZ digital data signal were to be recorded directly on magnetic tape, either special processing would be required or the data clock would also have to be recorded simultaneously in order to recover the digital data upon reproduction from the magnetic tape. This would require two recording heads, two reproducing heads, and two recording tracks on tape 38. Moreover, the recording of NRZ data directly on tape causes a DC signal which is not readily reproducible from the tape. It is thus advantageous to encode the NRZ data into a format which is not only easily recorded and reproduced, but which also encodes both the data and data clock into a single signal so that only one track need be used for recording on the magnetic tape, thus saving tape space and the number of recording and reproducing heads.

Figure 7C:
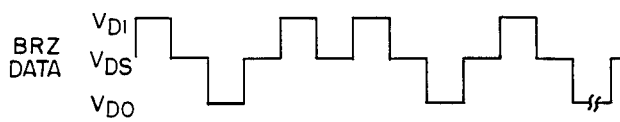
Figure 7D:
Figure 7E:
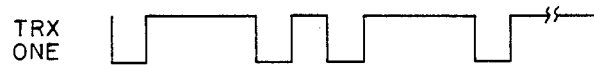
Figure 7F:
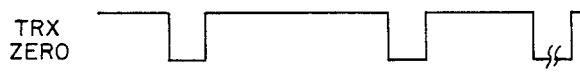

As shown in FIG. 7c, the NRZ data of FIG. 7a is encoded in bi-polar return to zero format (BRZ). In this format, a "1" bit is represented by a positive signal value, a "0" bit is represented by a negative signal value. In the BRZ format, the signal value representing the binary bit value only occupies one-half of the bit period with the second half of the bit period having a "return to zero" signal value. Thus, there is a "return to zero" signal value for each bit period and the data clock is therefore encoded into the BRZ data signal since there is a detectable signal transition for each bit period. As shown in FIG. 7c, "1" bit is represented by a first signal value $V_{D1}$ during the first half of the bit period and "return to zero" by a third signal value $V_{DS}$, during the second half of the bit period. A "0" bit is represented by a second signal value $V_{DO}$ during the first half of the bit period and a "return to zero" by the third signal value during the second half of the bit period.

According to the present invention, the BRZ data signal is modulated as a synchronous frequency modulation (FM) signal to be recorded on data track 18 of tape 38 (see FIG. 4). The "1" bit of the BRZ signal is converted to an FM signal $S_1$ having a frequency $n_1 f_D$; the "0" bit is represented by an FM signal $S_2$ having a frequency $n_2 f_D$ and the "return to zero" value of the BRZ signal is represented by an FM signal $S_3$ having a frequency $n_3 f_D$ where $n_1$, $n_2$, and $n_3$ are different integers including one. Thus, an NRZ digital data signal representing "1" bit has the form $S_1$, $S_3$ and a NRZ digital data signal representing a "0" bit has the form $S_2$, $S_3$. Since the FM signals $S_1$, $S_2$, $S_3$, have frequencies which are integral multiples of the data rate frequency $f_D$, the signals can be synchronously recorded on tape 38. As will be described later, synchronous FM encoding of the BRZ data signal permits unambiguous decoding of the NRZ data signal upon reproduction from tape 38 and also permits accurate recovery of the data clock signal.

Figures 6A, 6B:
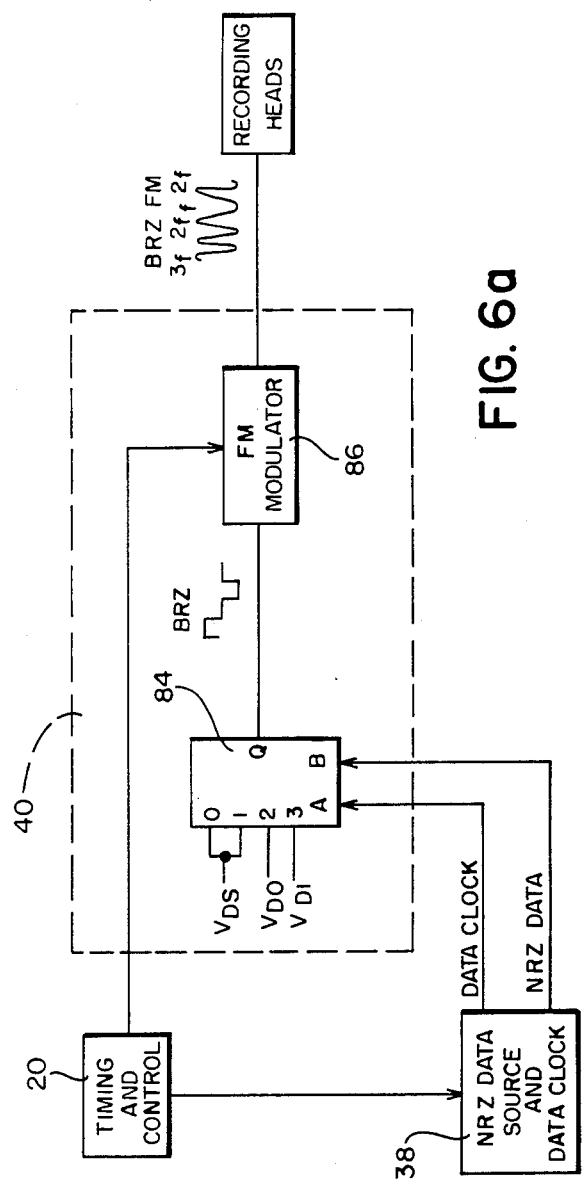
FIGS. 6a and 6b are a block diagram and truth table respectively of an embodiment of the present invention.

Referring now to FIGS. 6a and 6b, there is shown a data record processing circuit 40 (FIG. 1) illustrating the present invention. The data record processing circuit 40 is shown in a simplified form in which only a single speed is used for recording and playing back from tape 38. Processing circuit 40 includes a multiplexer 84 and an FM modulator 86. Multiplexer 84 has voltage input terminals 0123, data clock input A, NRZ data input B, and output Q. Voltage inputs 0 and 1 are connected together to a voltage source $V_{DS}$, voltage input 2 is connected to a voltage source $V_{DO}$ and voltage input 3 is connected to a voltage source $V_{D1}$. Data source 38 produces (1) an NRZ digital data signal which is applied to input B and (2) a synchronous data clock signal which is applied to input A.

Referring to the table in FIG. 6b, when the data clock signal applied to input A and the NRZ data signal applied to input B are both equal to a "zero", or when the data clock signal is "zero" and the NRZ data signal is "one", then the voltage $V_{DS}$ will be passed to output Q representing "return to zero". When the data clock signal is "one" and the NRZ data signal is "zero", then the voltage $V_{D0}$ will be passed to output Q (representing "0" bit) producing a negative pulse. When both inputs to A and B are "one", the voltage $V_{D1}$ (representing a "1" bit) will be passed to the Q output producing a positive pulse. Thus, multiplexer 84 converts the NRZ digital data signal and synchronous data clock signal into a BRZ digital data signal. The BRZ signal is supplied to FM modulator 86 which is a synchronous modulator and converts the BRZ data signal into a synchronous BRZ FM data signal. The $V_{D0}$ voltage signal is modulated as an FM signal with a frequency $f_D$ equal to an integral multiple of the data rate frequency of the NRZ data signal. The $V_{DS}$ voltage is modulated as an FM signal having a frequency $2f_D$ and the $V_{D1}$ voltage is modulated as an FM signal having a frequency $3f_D$. The three FM signals have frequencies which are integral multiples of the data frequency and are recorded on data track 18 of tape 38 in a synchronous manner. It will be appreciated that other integral multiples of the data frequency may also be used.

Figure 8A:
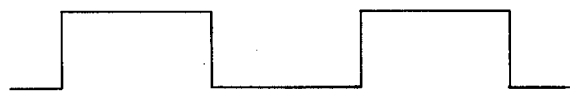
FIGS. 8a-8c are signal diagrams illustrating decoding of the BRZ FM data signal according to the present invention.
Figure 8B:
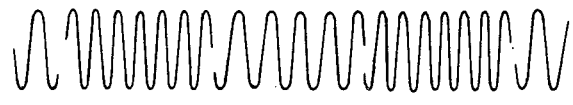
Figure 8C:
Figure 8D:
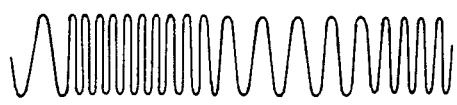
Figure 8E:

Referring to FIGS. 8a–8e, the advantage of synchronous FM modulation is illustrated. FIG. 8a shows a signal which varies from a voltage level $V_0$ to a voltage level $V_1$. If the signal of FIG. 8a were to be modulated as an FM frequency which was asynchronous at the transition points from $V_0$ to $V_1$ or from $V_1$ to $V_0$, the change in FM frequencies would take place at different signal levels and there would be an ambiguity in the region surrounding the transition point (e.g., the encircled regions of FIG. 8b). Thus, when the asynchronous FM signal is reproduced from the magnetic tape, there will be an undefined region of transition from one voltage level to another voltage level, thus causing an error in reproducing time between certain transitions (FIG. 8c). This result is undesirable and is obviated by the present invention in which the BRZ data signal is modulated as a synchronous FM signal. As shown in FIG. 8d, the change between FM signals of different frequencies occurs at a zero crossing point so that the recovered BRZ and NRZ signals will have sharply defined transition points (FIG. 8e) and accurate recovery of the original data bits and data clock.

Referring now to FIG. 9 and FIGS. 10a, 10b, and 10c, there is shown a preferred embodiment of the present invention. The data record processing circuit of FIG. 9 is adapted to be used with the motion analyzer of FIG. 1 so that variable tape speeds may be chosen by an operator and the frequencies of the BRZ FM signal to be recorded on tape will be changed accordingly.

The processing circuit of FIG. 9 includes a PROM 88, a latch 90, and a synchronous divide by M circuit 91 including programmable counters 92 and 94. Circuit 91 divides by a factor M a clock signal having a frequency $f_c$ provided by timing and control circuit 20. When the operator has selected a frame rate/speed reduction by means of selector 22 (FIG. 1), the frame rate is encoded as a three bit word which is applied to inputs $A_2$, $A_3$, and $A_4$ of PROM 88. The data clock signal and the NRZ data signal from data source 38 are applied to input $A_0$ and $A_1$, respectively of PROM 88. The BRZ FM signal is produced at the "Q" output of flip-flop 93 which is clocked synchronously with counters 92 and 94 by the clock signal $f_c$ from timing and control circuit 20.

Referring to FIG. 10b, there is shown a table relating the frame rate to the three bit word applied to inputs $A_2$–$A_4$ of PROM 88. Thus, if the operator choses a frame rate of 30 frames per second, the digital signal "101" will be applied to inputs $A_2$–$A_4$ of PROM 88. If a frame rate of 250 frames per second is chosen by the operator, the digital signal "010" will be applied to inputs $A_2$–$A_4$.

FIG. 10c is a table of the values of signal levels applied to data clock input $A_0$ and NRZ data input $A_1$, and the encoded BRZ signal level. Thus, when the inputs to $A_0$ and $A_1$ are either "00" or "10", the BRZ encoded signal level is "return to zero" (RTZ). When the $A_0 A_1$ inputs are "10", the BRZ encoding is $-1$ and when the inputs are "11", the BRZ encoding is $+1$. PROM 88 combines the tables shown in FIGS. 10a and 10c to produce an eight bit output at output terminals $Q_0$–$Q_7$. According to the frame rate and BRZ signal encoding indicated, the eight bit output from PROM 88 is latched in latch 90 and loaded into counters 92 and 94 when a load signal is applied at load inputs L of counters 92 and 94, respectively. Divide by M circuit 91 divides a clock signal from timing and control circuit 20 by the indicated divisor M. The appropriate divisors are shown in the table of FIG. 10a. For example, when a frame rate 125 is selected by the operator, the clock signal of 18.432 MHz is divided by a divisor M equal to "16" for a BRZ encoding of "$-1$" representing a "0" bit, thus producing a BRZ FM signal of 1.152 MHz. Further, the "RTZ" encoded signal produces a divisor M of "24", which results in a BRZ FM signal of 0.768 MHz, and a BRZ encoded signal "+1" representing a "1" bit produces a divisor M of "48" which results in a BRZ FM signal of 0.384 MHz. Thus, an NRZ bit of "1" is converted to a BRZ FM signal $S_1 S_3$, wherein $S_1$ has a frequency of 0.384 MHz and $S_3$ has a frequency of 0.768 MHz and an NRZ "0" bit is converted to a BRZ FM signal $S_2 S_3$, wherein $S_2$ has a frequency of 1.152 MHz and $S_3$ has a frequency of 0.768 MHz.

The BRZ FM signal is then recorded by means of recording heads 36 on data track 18 of tape 38.

Referring now to FIG. 11, there is shown a preferred embodiment of data playback processing circuit according to the present invention. The playback head 48 reproduces the BRZ FM data signal from tape 38. FM demodulator 66 demodulates the BRZ FM data signal into a BRZ data signal. From this BRZ data signal is recovered the original NRZ digital data signal such as represented in FIG. 7a and the synchronous data clock signal such as represented in FIG. 7b. To this end, the BRZ signal from demodulator 96 is applied to the "$-$" input of a comparator 98 and to the "$+$" of comparator 100. A voltage $V_1$ is applied to the "$+$" input of comparator 98 and a voltage $V_0$ is applied to the "$-$" input of comparator 100. The output of comparator 98 is a signal "TRX ONE" and the output of comparator 100 is a signal "TRX ZERO". In effect, comparators 98 and 100 convert the three analog levels of the BRZ data signal from FM demodulator 96 into three logic levels encoded on two logic lines. This conversion is shown more clearly with respect to FIGS. 11b and 11c. FIG. 11c shows the relationship between the BRZ signal levels $V_{D1}$, $V_{DS}$, and $V_{D0}$ and the comparator reference voltages $V_1$ and $V_0$. FIG. 11b is a table showing the relationship between the BRZ signal levels and the logic conditions of the two logic lines "TRX ONE" and "TRX ZERO". Thus, for a BRZ signal level $V_{D1}$ which represents a data bit "1", there will be a logic level "1" on line "TRX ONE" and a logic "1" on line "TRX ZERO", etc.

Figure 7G:
Figure 7H:
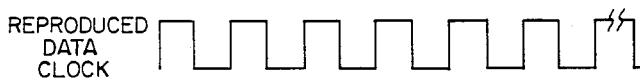
Figure 7I:

The "TRX ONE" signal (FIG. 7b) is supplied to one input of NAND gate 102 and to the D input of D flip-flop 104. The "TRX ZERO" signal (FIG. 7f) is applied to a second input of NAND gate 102. The output of NAND gate 102 is the reproduced original data clock signal (FIG. 7h) which is applied to the clock input of D flip-flop 104 and also to a retriggerable one-shot multivibrator 106. The output Q of D flip-flop 104 is the reproduced NRZ data signal. (FIG. 7g)

According to another aspect of the present invention, a special encoded synchronization bit is provided as a missing clock on the BRZ data signal. This missing clock is shown as a deleted clock signal during the period $P_M$ of data clock signal FIG. 7b). The deleted clock signal is encoded in the BRZ data signal as a "return to zero" signal level $V_{DS}$ (FIG. 7c). The "TRX ONE" and "TRX ZERO" signals are also applied to two inputs of AND gate 108, a third input of which is connected to one shot multivibrator 106, which is retriggered continuously by the reproduced data clock signal since multivibrator 106 has a period greater than the data clock period. However, a missed clock will allow the one shot multivibrator to change state and to trigger AND gate 108 to produce a FRAME SYNC pulse (FIG. 7i) which indicates the start of a block or frame of data. It will be noted that at the time of the missing clock pulse, the BRZ data is in the "return to zero" state so that the "TRX ONE" and "TRX ZERO" signals are both zero.

Although the invention has been described in detail with particular reference to preferred embodiments thereof, it will be understood that variations and modifications can be effected within the spirit and scope of the invention as described hereinabove and as defined in the appended claims.

What is claimed is:

1. Apparatus for processing digital data comprising:
    means for providing (1) a digital data signal having a Non-Return-to-Zero (NRZ) format and having a frequency $f_D$ and (2) a data clock signal having a frequency $f_D$ which is synchronous with said NRZ data signal; and
    means for converting said NRZ digital data signal and said data clock signal into a synchronous frequency modulated Bipolar Return-to-Zero (BRZ FM) data signal having a frequency $f_D$ in which a "1" bit is represented by an FM signal $S_1$ having a frequency $n_1 f_D$, a "0" bit is represented by an FM signal $S_2$, having a frequency $n_2 f_D$, and "return-to-zero" is represented by an FM signal $S_3$ having a frequency $n_3 f_D$, where $n_1$, $n_2$, and $n_3$ are different integers of 1 or greater, such that a "1" bit is represented by a BRZ FM signal $S_1 S_3$ and a "0" bit is represented by BRZ FM signal $S_2 S_3$.

2. The apparatus of claim 1 wherein said converting means includes (1) means for converting said NRZ digital data signal and said data clock signal into a BRZ digital data signal having a frequency $f_D$ and in which a "1" bit is represented by a first signal value, a "0" bit is represented by a second signal value and "return to zero" is represented by a third signal value; and (2) means for synchronously frequency modulating said BRZ digital data signal such that said first, second and third signal values are frequency modulated as said FM signal $S_1$ having a frequency $n_1 f_D$, said FM signal $S_2$ having a frequency $n_2 f_D$, and said FM signal $S_3$ having a frequency $n_3 f_D$.

3. The apparatus of claim 1 including means for recording said BRZ FM data signal on magnetic tape, means for reproducing said BRZ FM data signal from said magnetic tape and means for decoding said BRZ FM data signal as an NRZ digital data signal and a synchronous data clock signal, each signal of which has a frequency $f_D$.

4. The apparatus of claim 3 wherein said means for decoding includes (1) means for demodulating said BRZ FM data signal into a BRZ digital data signal in which a "1" bit is represented by a first signal value, a "0" bit is represented by a second value, and "return to zero" is represented by a third signal value, and (2) means for decoding the BRZ digital signal into a reproduced NRZ digital data signal and a reproduced data clock signal.

5. The apparatus of claim 1 wherein said providing means causes said data clock signal to have a deleted clock signal for at least one data period to represent a sync signal and wherein said converting means converts said deleted clock signal into a BRZ FM signal constituting a signal $S_3 S_3$.

6. The apparatus of claim 1 including means for recording video information relating to a scene on a plurality of parallel linear tracks on magnetic tape and means for recording said BRZ FM data signal on said magnetic tape in a data track which is parallel to said video information tracks wherein said BRZ FM data signal encodes information relating to said video information.

7. The apparatus of claim 6 including means for reproducing (1) said video information from said video information tracks on said tape and for displaying said video information as a scene on a video monitor and (2) said BRZ FM data signal from said data track on said tape and for displaying said data information on said video monitor simultaneously with said related scene.

8. In a motion analyzer in which scene information (1) is recorded at a first frame rate on magnetic tape moved at a first tape speed and (2) is played back at a second frame rate for display on a video monitor from said magnetic tape moved at a second slower tape speed thereby to produce a slow motion replay of said scene information, wherein the ratio of said first frame rate to said second frame rate equals the ratio of said first tape speed to said second tape speed, said ratio constituting a speed reduction ratio R, apparatus for processing digital data relating to a recorded frame of scene information comprising:
    means for providing (1) a digital data signal relating to scene information, having a Non-Return-to-Zero (NRZ) format and having a frequency $f_D$ and (2) a synchronous data clock signal having a frequency $f_D$;
    means for converting said NRZ digital data signal and said data clock signal into a synchronous frequency modulated Bipolar-Return-to-Zero (BRZ FM) data signal in which a "1" bit is represented by an FM signal $S_1$ having a frequency $n_1 f_D$, a "0" bit is represented by an FM signal $S_2$, having a frequency $n_2 f_D$ and "return-to-zero" is represented by an FM signal $S_3$ having a frequency $n_3 f_D$, where $n_1$, $n_2$, $n_3$ are different integers of 1 or greater; such that a "1" bit is represented by a BRZ FM signal $S_1 S_3$ and a "0" bit is represented by a BRZ FM signal $S_2 S_3$;

means for recording said BRZ FM data signal on said magnetic tape moved at said first tape speed;

means for playing back said BRZ FM data signal from said magnetic tape moved at said second slower tape speed wherein said $S_1$ signal has a frequency $n_1 f_D/R$, said $S_2$ signal has a frequency $n_2 f_D/R$ and said $S_3$ signal has a frequency $n_3 f_D/R$; and means for converting said played back BRZ FM data signal into an NRZ digital data signal and a synchronous data clock signal, both of which have a frequency $f_D/R$.

* * * * *